(12) United States Patent
Boyd

(10) Patent No.: US 7,224,387 B2
(45) Date of Patent: May 29, 2007

(54) METHOD AND APPARATUS FOR CORRECTING CAMERA TILT DISTORTION IN PANORAMIC IMAGES

(75) Inventor: David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1143 days.

(21) Appl. No.: 10/043,957

(22) Filed: Jan. 9, 2002

(65) Prior Publication Data

US 2003/0128276 A1 Jul. 10, 2003

(51) Int. Cl.
*H04N 2/62* (2006.01)
(52) U.S. Cl. .................. 348/239; 348/207.99
(58) Field of Classification Search .................. 348/36, 348/37, 39, 207.99, 241, 335, 222.1, 218.1, 348/211.4, 211.9; 382/141, 151
See application file for complete search history.

(56) References Cited

U.S. PATENT DOCUMENTS

| 5,097,325 | A | * | 3/1992 | Dill .............................. 348/37 |
| 5,764,276 | A | * | 6/1998 | Martin et al. ................ 725/146 |
| 6,144,406 | A | * | 11/2000 | Girard et al. ............. 348/211.4 |
| 6,552,744 | B2 | * | 4/2003 | Chen ....................... 348/218.1 |
| 6,711,284 | B1 | * | 3/2004 | Koide ......................... 382/141 |

* cited by examiner

*Primary Examiner*—Tuan Ho
(74) *Attorney, Agent, or Firm*—David W. Boyd

(57) ABSTRACT

A method removes distortion induced by camera tilt from a digital representation of a photograph taken with a rotational or swing-lens panoramic camera.

29 Claims, 9 Drawing Sheets

METHOD AND APPARATUS FOR CORRECTING CAMERA TILT DISTORTION IN PANORAMIC IMAGES

FIELD OF THE INVENTION

The present invention relates generally to panoramic photography.

BACKGROUND OF THE INVENTION

Panoramic cameras, that is, cameras capable of taking photographs with unusually wide horizontal fields of view, have existed for some time. This disclosure is concerned with panoramic photographs taken with rotational and swing-lens panoramic cameras.

A rotational panoramic camera rotates the camera body during the taking of a photograph, and may be capable of taking photographs with horizontal viewing angles of 360 degrees or more. The film inside the camera also moves in synchronization with the camera rotation. These cameras are sometimes called "Cirkut-type" cameras, after an early commercial model. A well-known contemporary camera of this type is the Roundshot, made by Seitz Phototechnik AG of Switzerland.

A swing-lens panoramic camera rotates the lens and an exposure slit but not the camera body. The film is held stationary in a curved shape and the image is painted onto the film as the exposure slit passes by it. This type of camera usually can take photographs with horizontal viewing angles just less than 180 degrees. Two well-known camera models that operate on this principle are the Widelux and Horizon cameras.

Digital panoramic cameras are also available. A digital panoramic camera rotates the entire camera while repeatedly reading image data from a row or set of rows of electronic light sensors behind the lens.

Most panoramic cameras have fixed focal length lenses that are fixed in position in relation to the film, and thus have a limited vertical field of view that is not adjustable. Some cameras provide a lens shift capability wherein the lens optical axis may be moved relative to the film. This allows the vertical field of view of the camera to be shifted up and down, but does not increase the vertical field of view. However, many panoramic cameras do not provide a lens shift capability.

Often, a panoramic camera is held level, with its rotational axis substantially vertical during the taking of a photograph so that the horizon in the photograph appears straight and level and to minimize distortion of objects in the photograph. If the camera is tilted so that its rotational axis is at an angle to vertical, objectionable camera-tilt distortion may be introduced into the photograph. Many camera models have level-indicating devices built into the camera bodies to aid the photographer in leveling the camera.

A panoramic camera may also be used with its rotational axis substantially horizontal in order to achieve an unusually large vertical field of view, or at some other angle with respect to vertical. Generally, however, these cameras are used to achieve a large horizontal field of view and are therefore used with their rotational axes substantially vertical.

This desire to keep the camera level and lack of adjustability may limit the photographer's ability to capture the desired elements of a scene. For example, the photographer may wish to photograph an entire building, the height of which would fit within the camera's vertical field of view, but be unable to include the top of the building in the photograph because of the requirement to keep the camera level to avoid distortion.

The photographer may be able to take the photograph from a more remote vantage point, thus allowing the camera's vertical field of view to encompass the entire building. However, this results in an undesirable loss of resolution of the subject in the resulting photograph, and a more remote vantage point may not be available.

In this situation the photographer has historically been faced with the choice of photographing the available vertical field of view which is not the desired field of view, tilting the camera to encompass the desired subject and accepting the resulting distortion, or using a more remote vantage point if one is available and accepting the resulting loss of subject resolution.

There is a need for a method of allowing the photographer to tilt a rotational or swing-lens lens panoramic camera, take a photograph that includes the resulting distortion, and recover an undistorted representation of the photograph later.

SUMMARY OF THE INVENTION

A method removes camera tilt distortion from a digital representation of a photograph taken with a rotational or swing-lens panoramic camera.

BRIEF DESCRIPTION OF THE DRAWINGS

FIG. 3a shows the cylindrical image surface of FIG. 1 tilted and placed in the coordinate system of FIG. 1a.

DETAILED DESCRIPTION OF THE PREFERRED EMBODIMENT

Figure 1:
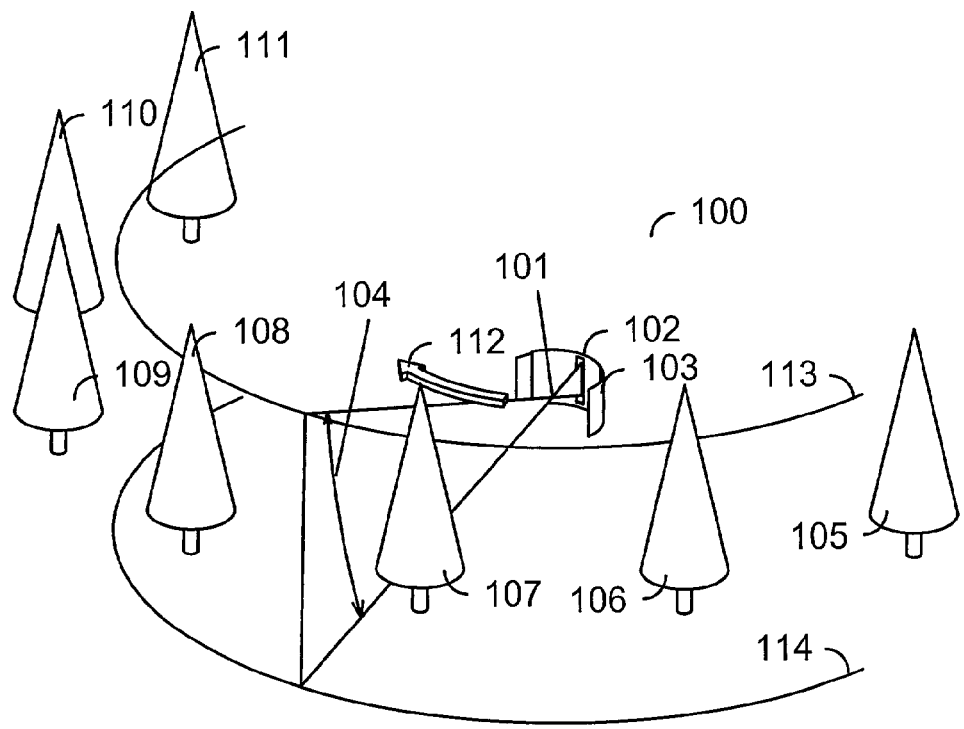
FIG. 1 is a diagram illustrating the operation of a rotational or swing-lens panoramic camera.

FIG. 1 schematically illustrates the operation of a rotational or swing-lens panoramic camera (100). Lens (101) is assumed to be a pinhole lens, which is modeled, as a point in space. Using a point lens model simplifies the description of the invention and introduces no appreciable error. An actual panoramic camera may use a lens including one or more reflective or refractive elements. An exposure slit (102) limits the horizontal field of view projected onto the image surface (103) by the lens (101) at any one time. The image surface (103) is conceptually depicted as a cylinder of film. This shape may be an accurate depiction for a swing lens camera. A Cirkut-type camera may hold its film in a different shape but present it to the lens by virtue of the camera and film motion so that the effect is as if the film were a cylinder. A digital panoramic camera effectively replaces the film with an electronic array light sensor.

As the camera (100) or lens (101) and slit (102) rotate, a complete image is sweepingly projected onto the cylindrical image surface (103). A camera body (not shown) excludes stray light not entering through the lens from hitting the cylindrical image surface (103). The vertical field of view (104) is determined by the focal length of the lens (101) and the height of the image surface (103). Trees (105–111) are partially within the field of view of the camera (100), and are placed on a level plane. The camera vertical field of view (104) is seen to include the base of each tree, but not the top. In FIG. 1, the camera (100) is held level, so that its axis of rotation is vertical. Direction arrow (112) indicates an arbitrary direction of rotation for the camera or lens and slit. Tracks (113) and (114) indicate the conceptual path taken by the edges of the camera field of view (104) at a particular distance from the camera. The camera field of view (104) extends to infinity away from the camera, but is shown as truncated in FIG. 1.

Cylindrical image surface (103) may be a cylinder of film, or may be the conceptual effective shape of film presented to the camera lens (101) by virtue of motion of the camera and film. Alternatively, image surface (103) may be the conceptual path of an electronic light sensor in a digital camera.

Figure 1A:
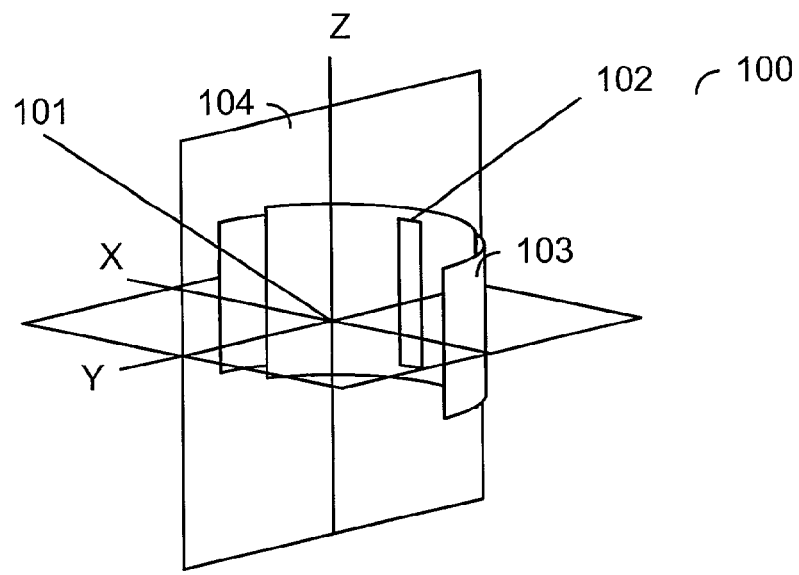
FIG. 1a illustrates a coordinate system for describing the motion and parameters of the camera shown in FIG. 1.

FIG. 1a illustrates a coordinate system for describing the motion and parameters of the camera (100). Coordinate axes X, Y, and Z define an orthogonal coordinate space. The X-Y plane is horizontal and the Z axis is vertical. The Y-Z plane (104) serves as a meridional plane of the camera (100). The Z axis is the rotational axis of the camera when the camera is held level as illustrated.

Figure 2:
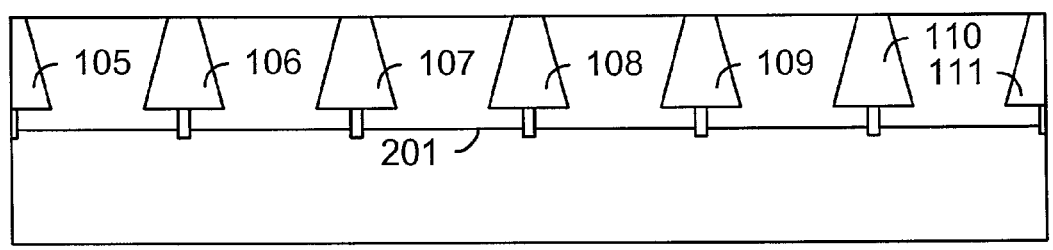
FIG. 2 shows an example photograph taken with a level rotational or swing-lens panoramic camera.

FIG. 2 shows an example photograph that may have been taken with the camera (100) as shown in FIG. 1. The tops of the equal-sized trees (105–111) do not show in the photograph because they extended beyond the vertical field of view (104) of the camera (100). The trees (105–111) appear uniform and undistorted because the camera (100) was held level. The horizon (201) in the photograph is straight and level.

Figure 3:
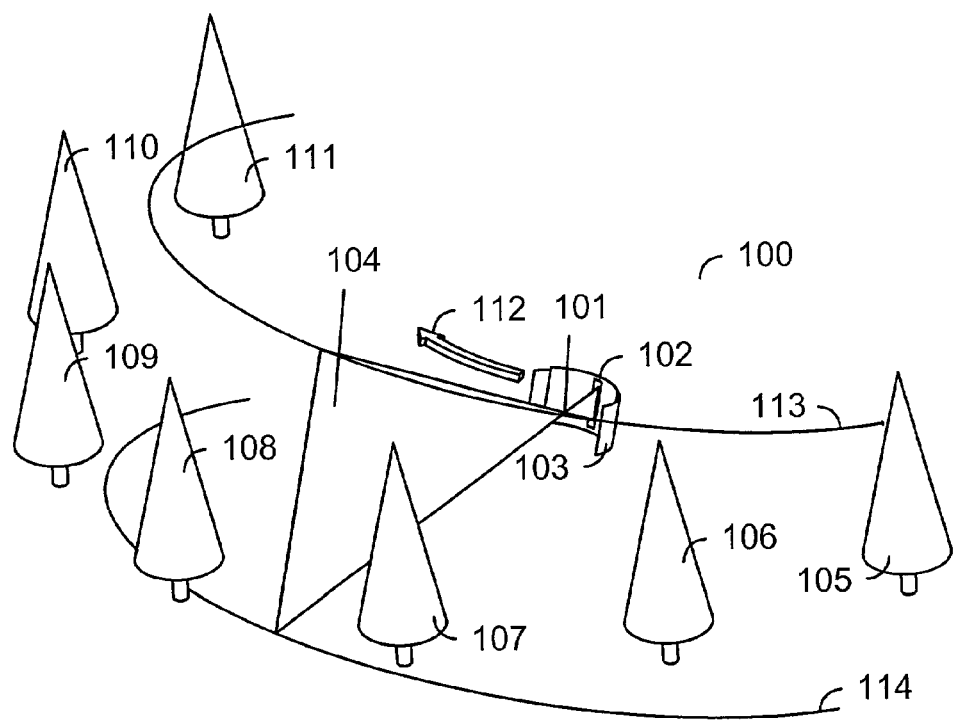
FIG. 3 illustrates the path of exposure covered when a panoramic camera is tilted.

In FIG. 3, the photographer has tilted the camera (100) so that its axis of rotation is no longer vertical, causing its vertical field of view (104) to encompass the top of the center tree (108) in the photograph. As shown, the rotation and tilt of the camera (100) cause the field of view to sweep in an arc across the trees (105–111). Conceptual track (113) passes above the center tree (108), but falls below the tops of the end trees (105, 111).

Figure 3A:
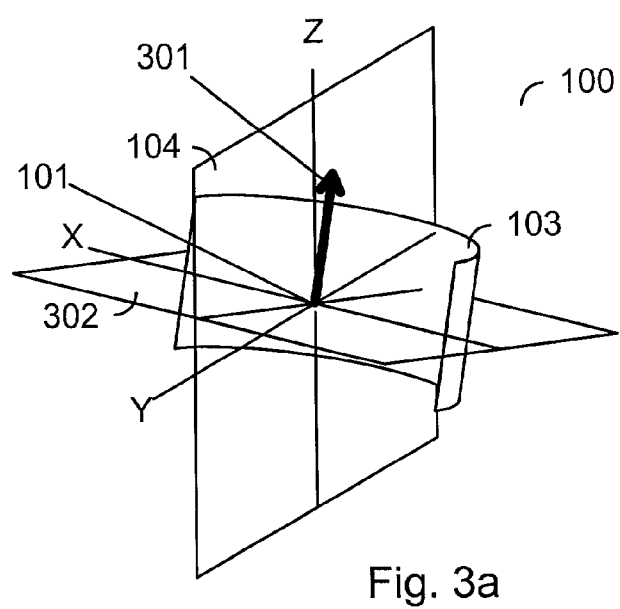

FIG. 3a shows the cylindrical image surface (103) tilted and placed in the coordinate system of FIG. 1a. Vector (301) depicts the rotational axis of the camera, and is at an angle with respect to the Z axis, indicating that the camera (100) is not level. Plane (302) is perpendicular to vector (301) and is an equatorial plane of the camera.

Figure 4:
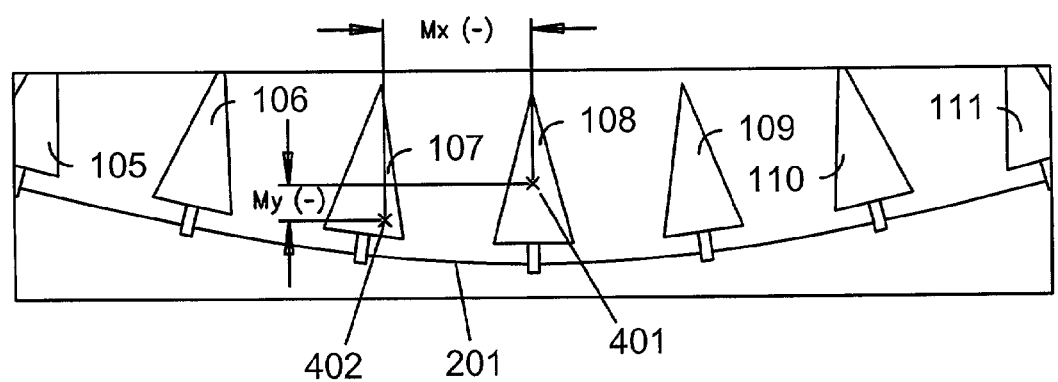
FIG. 4 shows an example photograph taken with a tilted rotational or swing-lens panoramic camera.

FIG. 4 shows an example photograph that may have been taken with the camera (100) as shown in FIG. 3. The center tree (108) is now framed completely in the vertical coverage of the photograph. However, the horizon (201) in the photograph is no longer straight or level, and the trees (105, 106, 107, 109, 110, 111) away from the center of the photograph appear to "lean" into the center of the photograph in general relation to their distance from the center of the photograph. This distortion is induced by the tilt of the axis of rotation of the camera (100), and is actually part of a sinusoidal pattern that would be apparent if a complete 360-degree photograph were illustrated. Point (401) indicates the zenith point of the path traced by the lens optical axis. This point serves an origin point of the distorted image for later calculations.

Measurements $M_x$ and $M_y$ indicate the coordinates in pixels relative to the location of origin (401) of an arbitrary example pixel (402) used to demonstrate an example embodiment of the invention. $M_x$ and $M_y$ indicate the location of the pixel in a digital representation of the photograph. Both $M_x$ and $M_y$ for the example pixel shown are negative numbers. For other locations in the image, $M_x$ or $M_y$ or both may be positive.

The general approach used in an example embodiment of the invention is to populate the finished rectified digital image by computing, for each pixel location in the rectified image, the corresponding pixel location in the original distorted digital image representation and copying, or "pulling" pixel data from the distorted digital image into the rectified digital image. It is also possible to start with pixels in the distorted digital image, calculate their corresponding locations in the rectified image, and place, or "push" the pixel data into the rectified image at the corresponding location. However, the "pulling" method chosen avoids difficulties that may arise due to nonuniform pixel spacing introduced by the transformation between the two images, simplifies interpolation, and also allows arbitrary scaling of the image.

Figure 5:
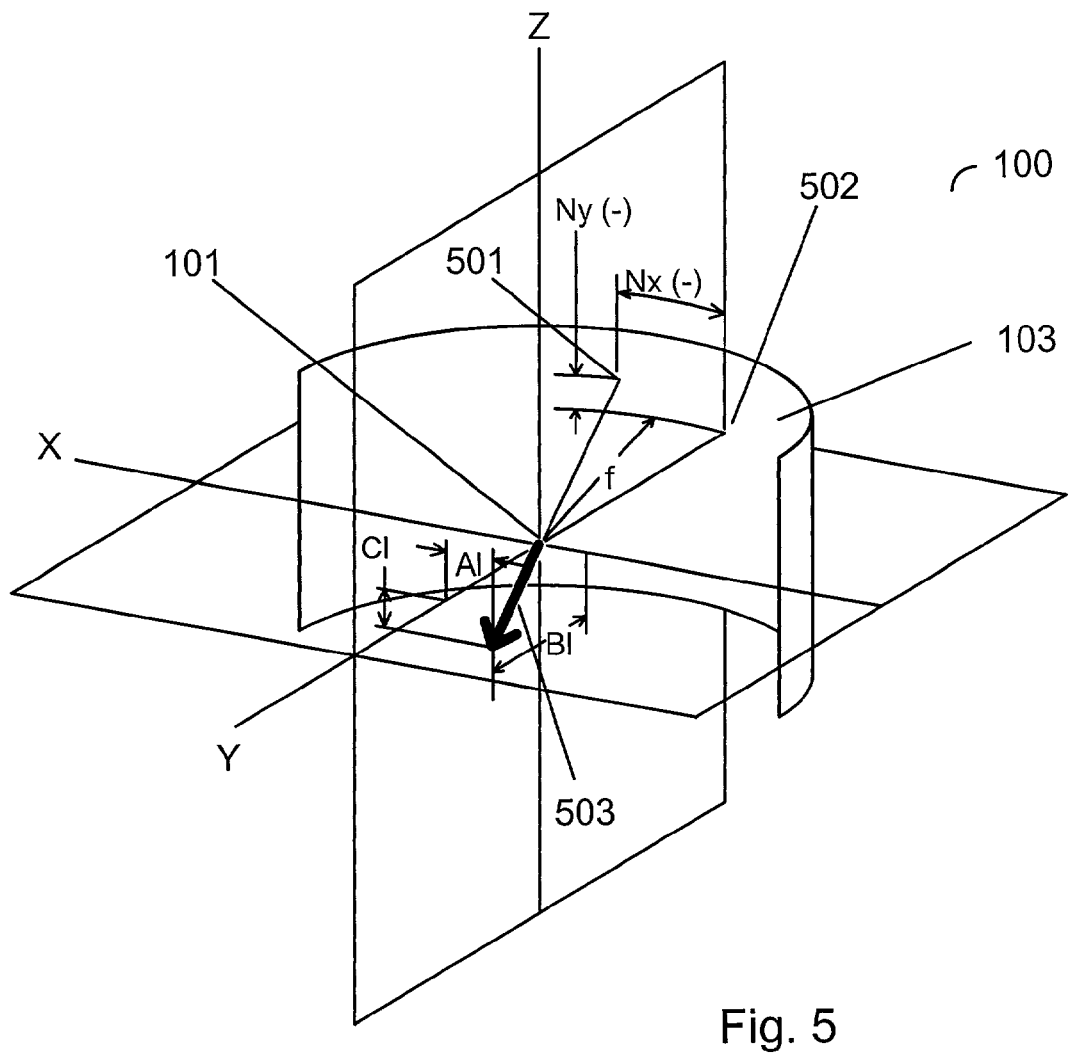
FIG. 5 illustrates a coordinate system used to describe an example embodiment of the invention.

FIG. 5 further illustrates a several parameters used to describe the operation of an untilted rotational or swing-lens panoramic camera (100). The coordinate origin serves as a model of a pinhole lens (101). A cylindrical image surface (103) has a radius equal to the lens focal length f, measured in millimeters. The cylindrical image surface (103) is centered on the Z axis. A location on the image surface (103) corresponds to a pixel (501) in a digital representation of the image. A second pixel (502) located at the point in the image corresponding to the intersection of the image surface (103) with the Y axis serves as an origin for pixel measurements in the digital image. A vector (503) defines a viewing direction corresponding to pixel (501), and is coincident with a line connecting the lens (101) at the coordinate origin with pixel (501).

The location in the digital image of pixel (501) in relation to the origin pixel (502) is given by pixel coordinates $N_x$ and $N_y$. $N_x$ is the number of pixels that pixel (501) is displaced from the origin pixel (502) angularly around the camera axis. $N_y$ is the number of pixels that pixel (501) is displaced from the origin pixel in a direction parallel to the camera rotational axis. The resolution of the digital image is given by $R_1$ and is measured in pixels per millimeter. The direction cosines of the viewing direction vector (503) are given by:

$$A_l = \frac{1}{\sqrt{(N_y/fR_1)^2 + 1}} \sin\left(\frac{N_x}{fR_1}\right) \quad (1)$$

$$B_l = \frac{1}{\sqrt{(N_y/fR_1)^2 + 1}} \cos\left(\frac{N_x}{fR_1}\right) \quad (2)$$

$$C_l = \frac{N_y}{\sqrt{N_y^2 + (fR_1)^2}} \quad (3)$$

These equations (1) through (3) map a pixel (501) in the desired rectified image to camera viewing directions described by viewing direction vector (503). One of skill in the art will recognize that equations (1) through (3) may be modified to accommodate a digital image whose X-direction resolution differs from its Y-direction resolution.

Figure 6:
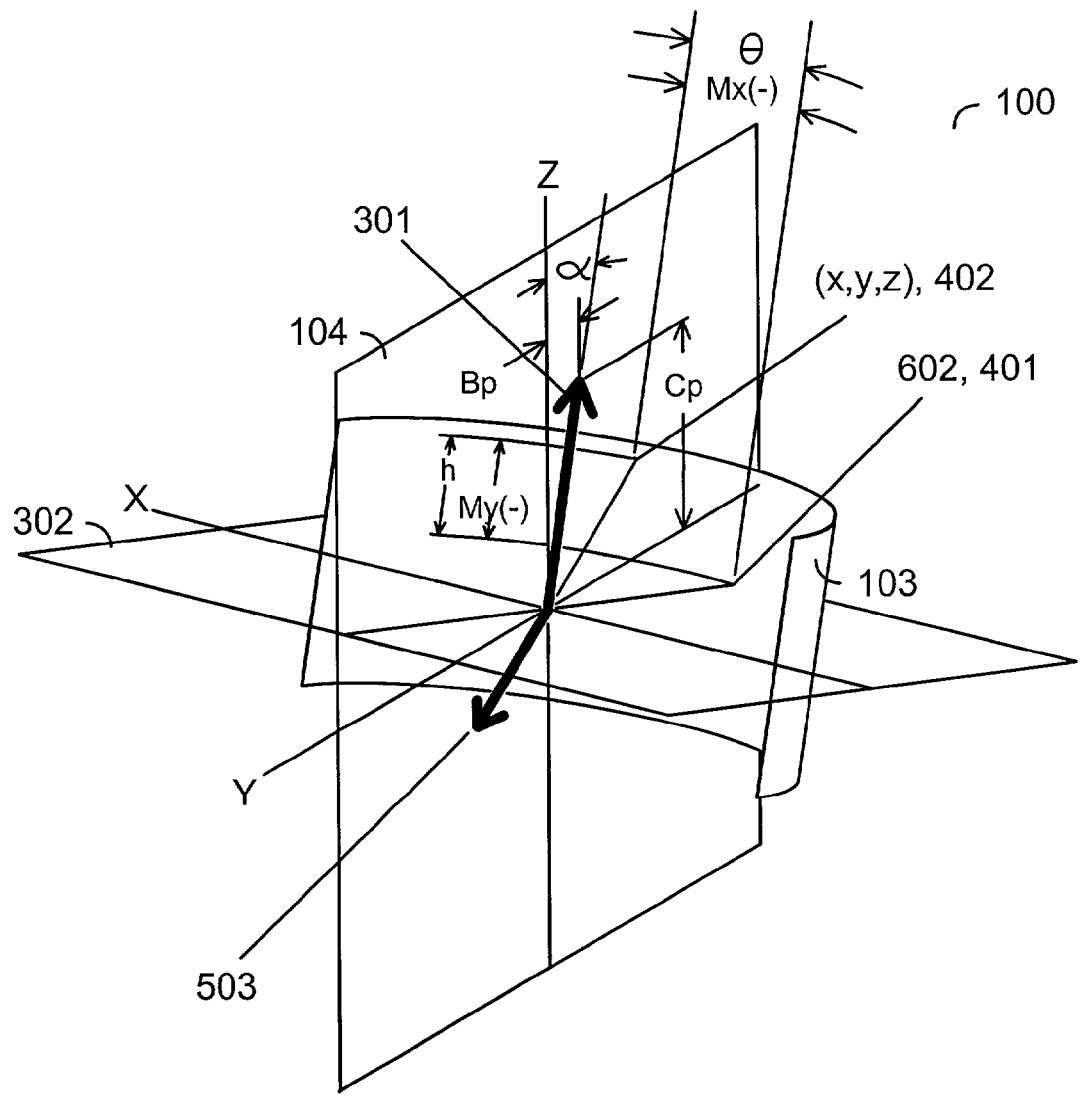
FIG. 6 illustrates a tilted panoramic camera in the coordinate system of FIG. 5.

FIG. 6 illustrates a tilted panoramic camera in the same coordinate system. Unit vector (301), having its origin at the coordinate origin and having direction cosines (0, $B_p$, $C_p$), is coincident with the axis of the tilted cylindrical image surface (103) and is the rotational axis of the camera (100). Rotational axis (301) forms an angle $\alpha$ with the Z axis, defining an angle of tilt of the camera (100). By virtue of this tilt:

$$B_p = -\sin(\alpha) \quad (4)$$

$$C_p = \cos(\alpha) \quad (5)$$

Unit vector (301) also defines plane (302) perpendicular to vector (301), which is an equatorial plane of the camera (100). The intersection of the tilted image surface (103) and the equatorial plane (302) forms a circular arc.

Unit vector (503), having its origin at the coordinate origin and having direction cosines ($A_l$, $B_l$, $C_l$) represents a viewing direction of the camera. An extension of unit vector (503) intersects the tilted cylindrical image surface (103) at point (x, y, z), representing where objects in the viewing direction indicated by unit vector (503) will be imaged on the tilted image surface (103), and corresponding to pixel (402) in the example image of FIG. 4.

The Y-Z plane (104) serves as a central meridional plane of the camera (100). The point (x, y, z) may be thought of as being angularly displaced by an angle $\theta$ about the camera rotational axis (301) from the camera's central meridional plane (104). Point (x, y, z) may also be thought of as displaced by a distance h from the camera equatorial plane (302) along a direction parallel to the camera rotational axis (301).

The coordinates of point (x, y, z) are given by:

$$x = \frac{-A_l f}{\sqrt{(C_p B_l - B_p C_l)^2 + A_l^2}} \quad (6)$$

$$y = \frac{-B_l f}{\sqrt{(C_p B_l - B_p C_l)^2 + A_l^2}} \quad (7)$$

$$z = \frac{-C_l f}{\sqrt{(C_p B_l - B_p C_l)^2 + A_l^2}} \quad (8)$$

The angular displacement angle $\theta$ and displacement distance h are given by:

$$\theta = \pi - \cos^{-1}\left(\frac{C_p y - B_p z}{\sqrt{(C_p y - B_p z)^2 + (C_p x)^2 + (B_p x)^2}}\right) \text{ if } x \geq 0 \quad (9a)$$

$$\theta = \cos^{-1}\left(\frac{C_p y - B_p z}{\sqrt{(C_p y - B_p z)^2 + (C_p x)^2 + (B_p x)^2}}\right) - \pi \text{ if } x < 0 \quad (9b)$$

$$h = B_p y + C_p z \quad (10)$$

Point (602) defines the point at which the lens optical axis intersects tilted cylindrical image surface (103) when the camera is viewing in the direction parallel to meridional plane (302). Point (602) also represents the point on the tilted cylindrical image surface (103) where objects in the direction of zenith point (401) are imaged. A pixel at point (602) in a digital representation of the image serves as the origin for pixel measurements in the distorted image.

The location in the distorted digital image of a pixel in relation to the origin pixel (602) is given by pixel coordinates $M_x$ and $M_y$. $M_x$ is the number of pixels that the pixel is displaced from the origin pixel (602) horizontally in the image (or angularly around the camera axis). $M_y$ is the number of pixels that the pixel is displaced vertically from the origin pixel (or in a direction parallel to the camera axis). $M_x$ and $M_y$ locate point (x, y, z) in pixel coordinates corresponding to physical measurements $\theta$ and h respectively. Where $R_2$ is the resolution of the distorted digital image measured in pixels per millimeter, $M_x$ and $M_y$ are given by:

$$M_x = f \theta R_2 \quad (11)$$

$$M_y = h R_2 \quad (12)$$

One of skill in the art will recognize that equations (11) and (12) may be modified to accommodate a digital image whose X-direction resolution differs from its Y-direction resolution.

Equations (5) through (12) map a viewing direction (503) to a location in a digital representation of a distorted photograph taken with a tilted camera. Image data may be copied or extracted from this pixel location and placed in a rectified digital image at location $N_x$, $N_y$. $M_x$ and $M_y$ need not be integers. The data may be copied or extracted using nearest neighbor, bilinear, bicubic, or another kind of interpolation.

Equations (1) through (12), applied in order to a location $N_x$, $N_y$ in the desired rectified digital image, compute the location $M_x$, $M_y$ in the original distorted image from where pixel data should be copied.

The camera optical structure comprises the lens (101) focal length f, the image surface (103) height and placement, and the rotation of the camera or the lens and exposure slit (102).

Figure 7:
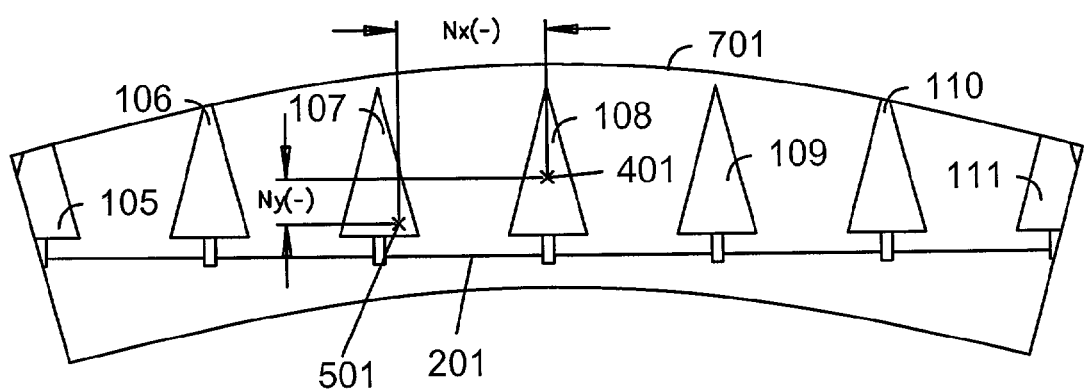
FIG. 7 shows the photograph of FIG. 4 after the camera tilt distortion has been removed by an example embodiment of the invention.

FIG. 7 shows the photograph produced by applying an example embodiment of the invention to the photograph of FIG. 4. The trees (105–111) in the photograph are uniform and undistorted. The horizon (201) in the photograph is straight and level. The center tree (108) is completely present in the photograph. The frame of the photograph (701) is now curved to reflect the true path traversed by the camera field of view (104) during the taking of the photograph. Measurements $N_x$ and $N_y$ indicate the coordinates in pixels of the arbitrary example pixel (501) used to demonstrate an example embodiment of the invention. $N_x$ and $N_y$ indicate the location of the pixel in a digital representation of the photograph. Both $N_x$ and $N_y$ for the example pixel are negative numbers.

Figure 8A:
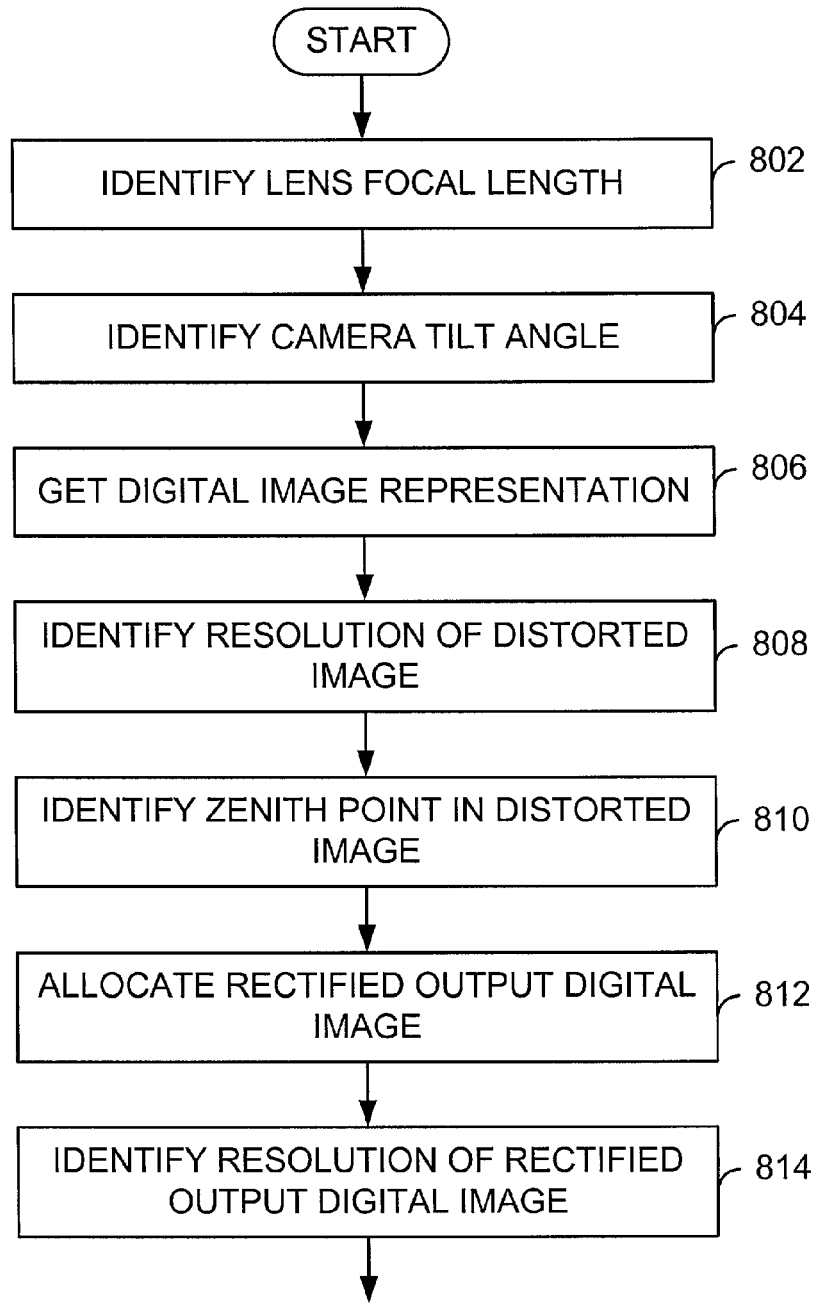
FIGS. 8A and 8B depict a flow chart describing the steps performed in an example embodiment of the inventions.
Figure 8B:
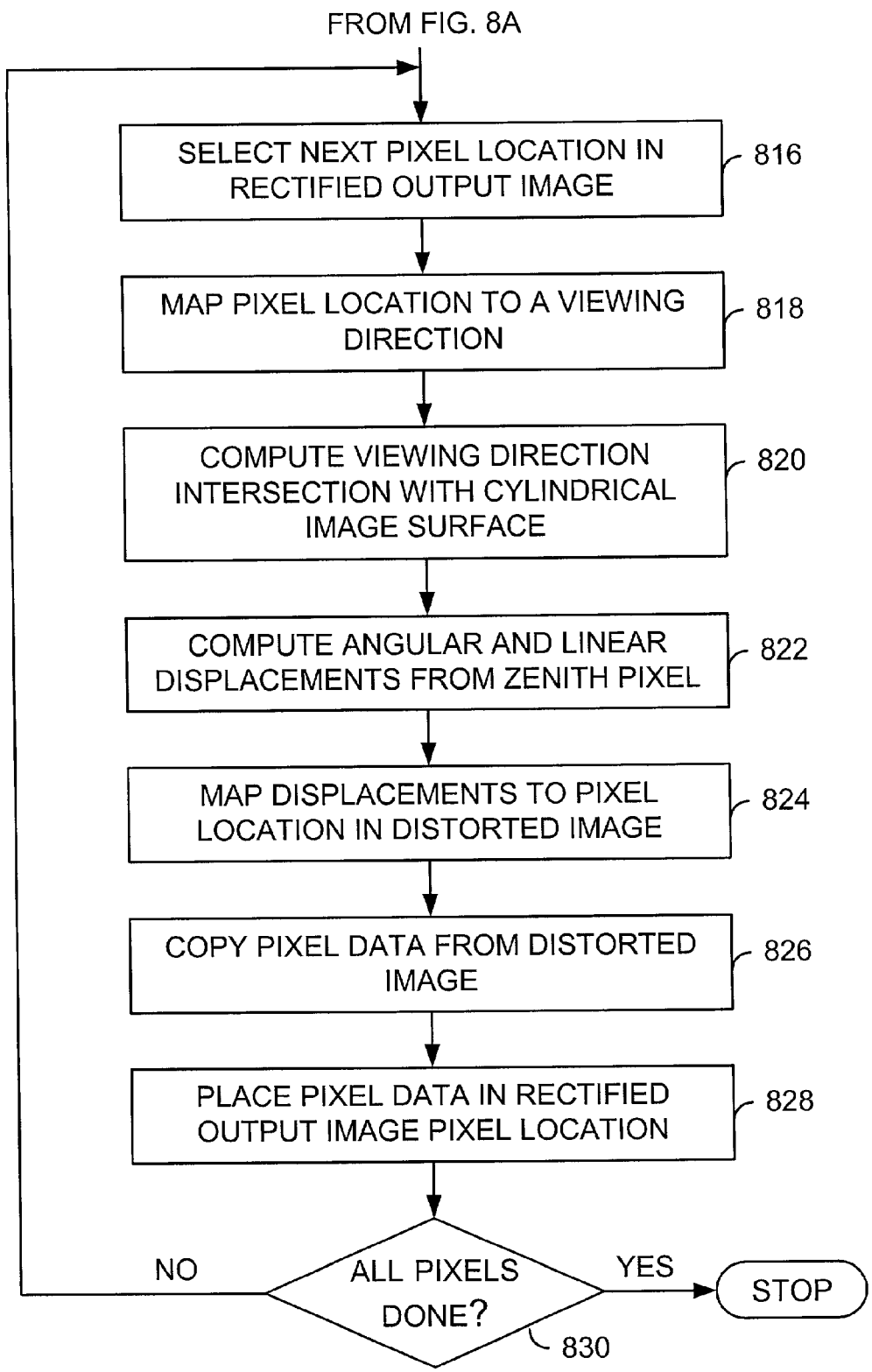

FIGS. 8A and 8B illustrate the steps involved in removing camera tilt distortion from a panoramic photograph according to an example embodiment of the invention. These steps may be typically performed with the aid of a processor.

In step 802, the focal length f of the camera lens (101) is identified.

In step 804, the tilt angle a of the camera (100) is identified. This serves to define unit vector (601) having direction cosines (0, $B_p$, $C_p$).

In step 806, a digital image representation, or digital image, of the photograph containing camera tilt distortion is obtained. Such a digital image may be obtained directly if the camera is a digital panoramic camera, or may be obtained by scanning a negative, positive, print, or display produced using a camera that records its photographs on film.

In step 808, the resolution $R_2$ of the digital image containing camera tilt distortion is identified.

In step 810, the zenith point is identified in the digital image containing camera tilt distortion. The zenith point is the point in the image corresponding to the viewing direction at which the camera lens optical axis reaches its maximum angle α from horizontal.

In step 812, an output digital image is allocated. This step may be entirely conceptual. It is not necessary that memory storage sufficient to hold the entire digital image be reserved.

In step 814, the resolution $R_1$ of the rectified output digital image is identified.

Steps 816 through 828 are performed for each pixel in the rectified output digital image.

In step 816, a pixel location is selected in the rectified output digital image and its location is specified by coordinates $N_x$ and $N_y$.

In step 818, the pixel location $N_x$, $N_y$ is mapped to a viewing direction described by unit vector (503) having direction cosines ($A_i$, $B_i$, $C_i$).

In step 820, the intersection point (x, y, z) is computed. This point is the intersection of a line coincident with viewing direction unit vector (503) and the tilted cylindrical image surface (103).

In step 822, the angular displacement θ and linear displacement h of the image pixel at (x, y, z) from the origin point (602) are computed.

In step 824, the angular displacement θ and linear displacement h are mapped to a pixel location in the distorted digital image representation. The pixel location is specified by coordinates $M_x$ and $M_y$.

In step 826, pixel data is copied or extracted from location $M_x$, $M_y$ in the distorted digital image representation, by nearest neighbor, bilinear, bicubic, or other interpolation means.

In step 828, the copied or extracted pixel data is placed in location $N_x$, $N_y$ of the rectified output image.

The method described above will typically be implemented with the aid of a stored program running on a computer or data processing system. The data processing system may be a personal computer comprising a central processing unit such as a microprocessor, primary memory such as random access memory (RAM) or read-only memory (ROM) or the like, secondary memory such as a magnetic disk drive or magnetic tape drive or the like, and one or more input/output devices such as video display terminals or printers or network connections or the like. The data processing system may also be in a camera. The program may be distributed on floppy disk, CD ROM, memory card, via a network, or by other means or media, or may be installed in the camera itself. During the running of the program, all or part of a digital representation of a photograph including camera tilt distortion, as depicted in FIG. 4, may be stored in the computer's memory. The entire digital image including distortion may be stored on a disk drive associated with the computer, on a floppy disk, on a magnetic tape, on a memory card, at a remote location accessible over a network, or by some other means or media. All or part of a rectified digital image, as depicted in FIG. 7, may also be stored in the computer's memory. The entire rectified digital image, at the completion of the distortion removal or as the distortion removal progresses, may also be stored on a disk drive associated with the computer, on a floppy disk, on a magnetic tape, at a remote location accessible over a network, or by some other means or media. The program may display the rectified digital image. The program may also print the rectified digital image.

The foregoing description of the present invention has been presented for purposes of illustration and description. It is not intended to be exhaustive or to limit the invention to the precise form disclosed, and other modifications and variations may be possible in light of the above teachings. For example, various dimensions used in the characterization of the camera and digital image representations may be expressed in different units of measurement that used in the above disclosure. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for removing camera tilt distortion from a panoramic photograph comprising the steps of:
    a) obtaining a first digital representation of the photograph; and
    b) establishing a correspondence between pixel locations in a rectified second digital representation of the photograph and pixel locations in the first digital representation; and
    c) copying pixel data from pixel locations in the first digital representation to the corresponding pixel locations in the second digital representation.

2. The method of claim 1, further comprising storing the rectified second digital representation.

3. The method of claim 1, further comprising printing the rectified second digital representation.

4. The method of claim 1, wherein establishing a correspondence between pixel locations in the rectified second digital representation of the photograph and pixel locations in the first digital representation further comprises the steps of:
    a) mapping pixels in the rectified second digital representation of the photograph to camera viewing directions; and
    b) computing intersections of the viewing directions with a conceptual cylindrical image surface; and
    c) mapping the intersections to pixel locations in the first digital representation of the photograph.

5. The method of claim 4, further comprising storing the rectified second digital representation.

6. The method of claim 4, further comprising printing the rectified second digital representation.

7. The method of claim 4, further comprising the steps of:
    a) identifying a zenith pixel in the first digital representation of the photograph; and
    b) measuring pixel locations in the first digital representation of the photograph in relation to the zenith pixel.

8. The method of claim 4 wherein copying pixel data from a location in the first digital representation of the photograph is accomplished using interpolation.

9. The method of claim 4 wherein the conceptual cylindrical image surface has a radius equal to a focal length of a lens of the panoramic camera.

10. The method of claim 4 further comprising identifying an angle at which a rotational axis of the camera was tilted from vertical at the time the photograph was taken.

11. The method of claim 1, wherein establishing a correspondence between pixel locations in the rectified second digital representation of the photograph and pixel Locations in the first digital representation further comprises the steps of:
   a) mapping pixels in the first digital representation of the photograph to camera viewing directions; and
   b) computing intersections of the viewing directions with a conceptual cylindrical image surface; and
   c) mapping the intersections to pixel locations in the second rectified digital representation of the photograph.

12. A data processing system for removing camera tilt distortion from a panoramic photograph comprising:
   a) processor means for processing data; and
   b) storage means for storing data on a storage medium; and
   c) program means for reading a first digital representation of the photograph; and
   d) program means for establishing a correspondence between pixel locations in a rectified second digital representation of the photograph and pixel locations in the first digital representation; and
   e) program means for copying pixel information from the locations in the first digital representation to the pixel locations in the second rectified digital representation.

13. The data processing system of claim 12 wherein the program means for establishing a correspondence between pixel locations in the rectified second digital representation of the photograph and pixel locations in the first digital representation further comprises:
   a) program means for mapping pixel locations in a rectified second digital representation to camera viewing directions; and
   b) program means for mapping the camera viewing directions to locations on a conceptual tilted cylindrical image surface; and
   c) program means for mapping locations on the tilted cylindrical image surface to pixel locations in the first digital representation.

14. The data processing system of claim 13 further comprising program means for storing the second rectified digital representation.

15. The data processing system of claim 13 further comprising program means for printing the second rectified digital representation.

16. A camera comprising a data processing system programmed to remove camera tilt distortion from a digital representation of a panoramic photograph, and further comprising:
   a) program means for reading a first digital representation of the photograph; and
   b) program means for mapping pixel locations in a rectified second digital representation to camera viewing directions; and
   c) program means for mapping the camera viewing directions to locations on a conceptual tilted cylindrical image surface; and
   d) program means for mapping locations on the tilted cylindrical image surface to pixel locations in the first digital representation; and
   e) program means for copying pixel information from the locations in the first digital representation to the pixel locations in the second rectified digital representation.

17. The camera of claim 16 further comprising program means for storing the second rectified digital representation.

18. The camera of claim 16 further comprising program means for printing the second rectified digital representation.

19. A computer programmed to remove camera tilt distortion from a digital representation of a panoramic photograph comprising:
   a) program means for obtaining a first digital representation of the photograph; and
   b) program means for establishing a correspondence between pixel locations in a rectified second digital representation of the photograph and pixel locations in the first digital representation; and
   c) program means for copying pixel data from pixel locations in the first digital representation to the corresponding pixel locations in the second digital representation.

20. The computer of claim 19 wherein the program means for mapping pixel locations in the rectified second digital representation of the photograph to corresponding pixel location in the first digital representation further comprises:
   a) program means for mapping pixel locations in a rectified second digital representation to camera viewing directions; and
   b) program means for mapping the camera viewing directions to locations on a conceptual tilted cylindrical image surface; and
   c) program means for mapping locations on the tilted cylindrical image surface to pixel locations in the first digital representation.

21. A computer-readable storage medium containing a program executable by a computer for removing camera tilt distortion from a panoramic photograph, the program comprising:
   a) program means for obtaining a first digital representation of the photograph; and
   b) program means for mapping pixel locations in a rectified second digital representation of the photograph to corresponding pixel locations in the first digital representation; and
   c) program means for copying pixel data from pixel locations in the first digital representation to the corresponding pixel locations in the second digital representation.

22. A method for correcting distortion induced by camera tilt in a panoramic photograph comprising:
   a) obtaining a first digital representation of the photograph; and
   b) selecting a plurality of camera viewing directions; and
   c) determining locations in a rectified second digital representation of the photograph where objects in the viewing directions should appear; and
   d) determining corresponding locations in a first digital representation of the photograph the objects do appear; and
   e) transferring pixel data from locations in the first digital representation to the corresponding locations in the second digital representation.

23. The method of claim 22, further comprising identifying an angle by which a rotational axis of the camera deviates from vertical.

24. The method of claim 22 further comprising storing the rectified second digital representation of the photograph.

25. The method of claim 22 further comprising printing the rectified second digital representation of the photograph.

26. A method for correcting distortion induced by camera tilt in a panoramic photograph comprising:
  a) obtaining a first digital representation of the photograph; and
  b) selecting a plurality of camera viewing directions; and
  c) determining locations in the first digital representation of the photograph where objects in the viewing directions appear; and
  d) determining corresponding locations in a second rectified digital representation of the photograph where the objects should appear; and
  e) transferring pixel data from locations in the first digital representation to the corresponding locations in the second digital representation.

27. The method of claim 26, further comprising identifying an angle by which a rotational axis of the camera deviates from vertical.

28. The method of claim 26 further comprising storing the rectified second digital representation of the photograph.

29. The method of claim 26 further comprising printing the rectified second digital representation of the photograph.

* * * * *

UNITED STATES PATENT AND TRADEMARK OFFICE
CERTIFICATE OF CORRECTION

| | | |
|---|---|---|
| PATENT NO. | : 7,224,387 B2 | Page 1 of 1 |
| APPLICATION NO. | : 10/043957 | |
| DATED | : May 29, 2007 | |
| INVENTOR(S) | : David W. Boyd | |

It is certified that error appears in the above-identified patent and that said Letters Patent is hereby corrected as shown below:

In column 6, line 63, delete "a" and insert -- $\alpha$ --, therefor.

In column 7, line 38, delete "$M_y$" before "$M_y$" and insert -- $M_x$ --, therefor.

In column 8, line 59, in Claim 7, delete "tbe" and insert -- the --, therefor.

In column 9, line 6, in Claim 11, delete "Locations" and insert -- locations --, therefor.

Signed and Sealed this

Nineteenth Day of May, 2009

JOHN DOLL
*Acting Director of the United States Patent and Trademark Office*